(12) United States Patent
Sasada et al.

(10) Patent No.: US 6,505,647 B2
(45) Date of Patent: Jan. 14, 2003

(54) FOUR-WAY SELECTOR VALVE

(75) Inventors: Eiichi Sasada, Tokyo (JP); Tetsuya Aoki, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 09/779,671

(22) Filed: Feb. 9, 2001

(65) Prior Publication Data

US 2001/0013369 A1 Aug. 16, 2001

(30) Foreign Application Priority Data

| Feb. 10, 2000 | (JP) | ................................. | 2000-033730 |
| Mar. 2, 2000 | (JP) | ................................. | 2000-056666 |
| Apr. 26, 2000 | (JP) | ................................. | 2000-125465 |
| Oct. 30, 2000 | (JP) | ................................. | 2000-330377 |

(51) Int. Cl.[7] .............................................. F16K 11/06
(52) U.S. Cl. ................................. 137/625.43; 251/287
(58) Field of Search ........................ 137/625.43; 251/287

(56) References Cited

U.S. PATENT DOCUMENTS

| 330,861 A | * 11/1885 | Wuerpel | ................. | 137/625.43 |
| 2,855,000 A | * 10/1958 | Allen et al. | ............ | 137/625.43 |
| 5,690,144 A | * 11/1997 | Takahashi | .............. | 137/625.43 |

\* cited by examiner

Primary Examiner—John Fox
(74) Attorney, Agent, or Firm—Rader, Fishman & Grauer, PLLC

(57) ABSTRACT

The four-way selector valve relating to the invention basically comprises a motor which has a stator and a rotor, a case, and a main body including a main valve and a valve seat, both of which are arranged in a valve chest within the case. The valve seat has a suction pressure passage and a discharge pressure passage, which lead to a suction port of a compressor and a discharge port thereof, respectively, and two passage holes which lead to indoor and outdoor heat exchangers, respectively. The main valve has a connecting part which selectively leads to one of the suction pressure passage and the two passage holes, and a pressure equalization orifice which links the connecting part and the valve chest. A rotor sleeve, which comprises the rotor, is equipped with an auxiliary valve which opens or closes the pressure equalization orifice in order to transfer pressure, and an operating pin which moves the position of the main valve. The rotor of the motor rotates the auxiliary valve on the main valve and slides the main valve on the valve seat via the operating pin.

7 Claims, 8 Drawing Sheets

(a)

(b)

FOUR-WAY SELECTOR VALVE

FIELD OF THE INVENTION

This invention relates to a four-way selector valve and more particularly to a four-way selector valve which has a main valve equipped with a relief valve for discharge pressure as an auxiliary valve.

DESCRIPTION OF THE RELATED ART

Conventionally, an air conditioner used for air-conditioning a room or for a similar purpose allows for cooling or heating depending on seasons by switching the flowing direction of refrigerant with a selector valve.

FIG. 8 illustrates an example of a cooling/heating cycle of an air conditioner using the selector valve. For this cycle, a compressor C, a selector valve SV, heat exchangers $E_1$ and $E_2$, and an electronic linear control valve T are connected. As indicated with solid-line arrows, the refrigerant as used for the cooling operation flows through the compressor C, the selector valve SV, an outdoor heat exchanger E1, the electronic linear control valve T, and an indoor heat exchanger E2 in this order. The refrigerant then completes the circulation by returning through the selector valve SV to the compressor C. In contrast, as indicated with dot-dash lines, the refrigerant as used for the heating flows through the compressor C, the selector valve SV, the indoor heat exchanger $E_2$, the electronic linear control valve T, and the outdoor heat exchanger E1 in this order. The refrigerant then completes the circulation by returning through the selector valve SV to the compressor C.

As an example of the selector valve, an art for a four-way selector valve was proposed. (See, e.g., Japanese Utility Model Registration No. 2523031). The proposed art comprises an electromagnet provided on a valve main body, a valve seat mounted at the bottom of the main body, and a rotatable valve provided in the valve main body. The valve seat has, at given angles and spacing, a discharge pressure passage which introduces the discharge pressure of the compressor, a suction pressure passage which introduces the suction pressure, a passage hole for an indoor heat exchanger and a passage hole for an outdoor heat exchanger, which lead to the respective heat exchangers. The rotatable valve is formed from plastic magnet, and has a guide hole which may alternately connect the discharge pressure passage to one of the two passage holes, and a connecting groove which may alternately connect the suction pressure passage to one of the two passage holes. The discharge pressure passage is provided with a conduit whose leading end extrudes to the end of the guide hole. The extruding part of the conduit makes contact with the end of the guide hole, thereby serving as a stopper to limit the rotation of the valve.

As another example of a similar four-way selector valve, an art is proposed for a four-way selector valve comprising (a) a valve seat which has a discharge pressure passage, a suction pressure passage, a passage hole for an indoor heat exchanger and a passage hole for an outdoor heat exchanger, (b) a freely sliding main valve which switches to one of the passage holes, (c) a valve chest which is formed in the main body of the valve by covering all of the passage holes with the main valve, (d) an auxiliary valve which opens/closes the suction pressure passage using magnetic force, and (e) a spring which connects the auxiliary valve and the main valve; wherein the diameter of the discharge pressure passage is smaller than that of the suction pressure passage (see, e.g., Japanese Examined Patent Publication No. 1-32389/1989).

Among the conventional arts, the rotatable valve or a four-way selector valve disclosed in the Japanese Utility Model Registration No. 2523031 uses switching between the flow paths for refrigerant via the discharge pressure passage, the passage hole, the suction pressure passage, and the other passage hole, which is performed inside and outside the main valve. The suction pressure occurs inside the main valve, while the discharge pressure occurs at high pressure outside the main valve. Therefore, there is a pressure difference across the main valve, which tends to cause the switching operation to become heavy. For this four-way selector valve, no particular consideration is given to make easier and quicker the switching operation between the flow paths for refrigerant.

Among the conventional arts, the four-way selector valve according to Japanese Examined Patent Publication No. 1-32389/1989 uses switching between flow paths for refrigerant by the main valve after eliminating the pressure difference across the main body of the valve. Since the main valve is rotated by the elongation and compression of elastic members, no special consideration is given to make quicker the switching operation between the flow paths for refrigerant, nor to the reliability of the four-way selector valve.

SUMMARY OF THE INVENTION

The object of the invention is to provide a four-way selector valve which provides easier and quicker switching between flow paths for refrigerant, assures higher reliability, and allows itself to be configured more simply to decrease product cost. In order to accomplish the object, the four-way selector valve of the present invention basically comprises a motor which has a stator and a rotor, a case, and a main body. The main body includes a main valve and a valve seat, both of which are arranged in a valve chest within the case. The valve seat has a suction pressure passage led to a suction port of a compressor, and a discharge pressure passage led to a discharge port of the compressor. The valve seat further has two passage holes led to indoor and outdoor heat exchangers, respectively. The main valve has a connecting part which selectively connects the suction pressure passage to one of the two passage holes, and a pressure equalization orifice which links the connecting part and the valve chest. The rotor comprises a rotor sleeve having the auxiliary valve which opens or closes the pressure equalization orifice in order to transfer pressure. The operating pin moves the position of the main valve. The rotor of the motor rotates the auxiliary valve on the main valve and slides the main valve on the valve seat via the operating pin.

The four-way selector valve of the invention, which is configured as described above, may have, on the main valve, an auxiliary valve which moves pressure inside and outside the main valve. The rotation of the rotor may turn the auxiliary valve to rotate on the main valve, thereby to open or close the pressure equalization orifice so that pressure may move between the connecting part and the valve chest. In addition, the main valve slides on the valve seat in the valve chest. Therefore, the number of operating parts may be reduced, the configuration of the selector valve may be made simpler, the reliability of the inverter valve can be improved, and the switching operation between flow paths for refrigerant can be performed easily and quickly by the main valve.

Another embodiment of the four-way selector valve according to this invention is that the auxiliary valve may be a relief valve, located between the rotor and the main valve, retained to the rotor sleeve, and mounted on the main valve so that it may slide thereon. Alternatively, the rotor sleeve may be equipped with a supporting shaft concentric to the rotational center of the main valve, and the operating pin may be retained to the rotor sleeve and turns the main valve while rotating together with the rotor.

Yet another embodiment of the four-way selector valve according to the invention is that the supporting shafts at the top and bottom of the rotor sleeve may be provided with elastic members which energize or press the auxiliary valve and the main valve toward the valve seat. Alternatively, the valve seat may be provided with a main valve stopper which limits the rotation range of the main valve and that the main valve has a stopper contactor which makes contacts with the main valve stopper. The position of switching by the main valve between the flow paths for refrigerant can securely be regulated, and the production cost for the main valve can be reduced if a same material is used for the stopper contactor and the main valve.

Still another embodiment of the four-way selector valve according to the invention is that either the main valve stopper or the stopper contactor comprises a magnet and that the other consists of a magnetic substance. The switching position for the flow paths for refrigerant can be more securely retained by the magnetic force of the main valve stopper or the stopper contactor, and the vibration resistance of the four-way selector valve can be further improved.

Another embodiments of the four-way selector valve according to the invention is that at least one of the main valve, the auxiliary valve, and the valve seat may be coated with lubricative anodized aluminum film, which improves the lubricative property in sliding the main valve or the auxiliary valve. As a result, the sliding friction may become so low that the stable operation can be performed.

DETAILED DESCRIPTION OF PREFERRED EMBODIMENTS

Figure 1:
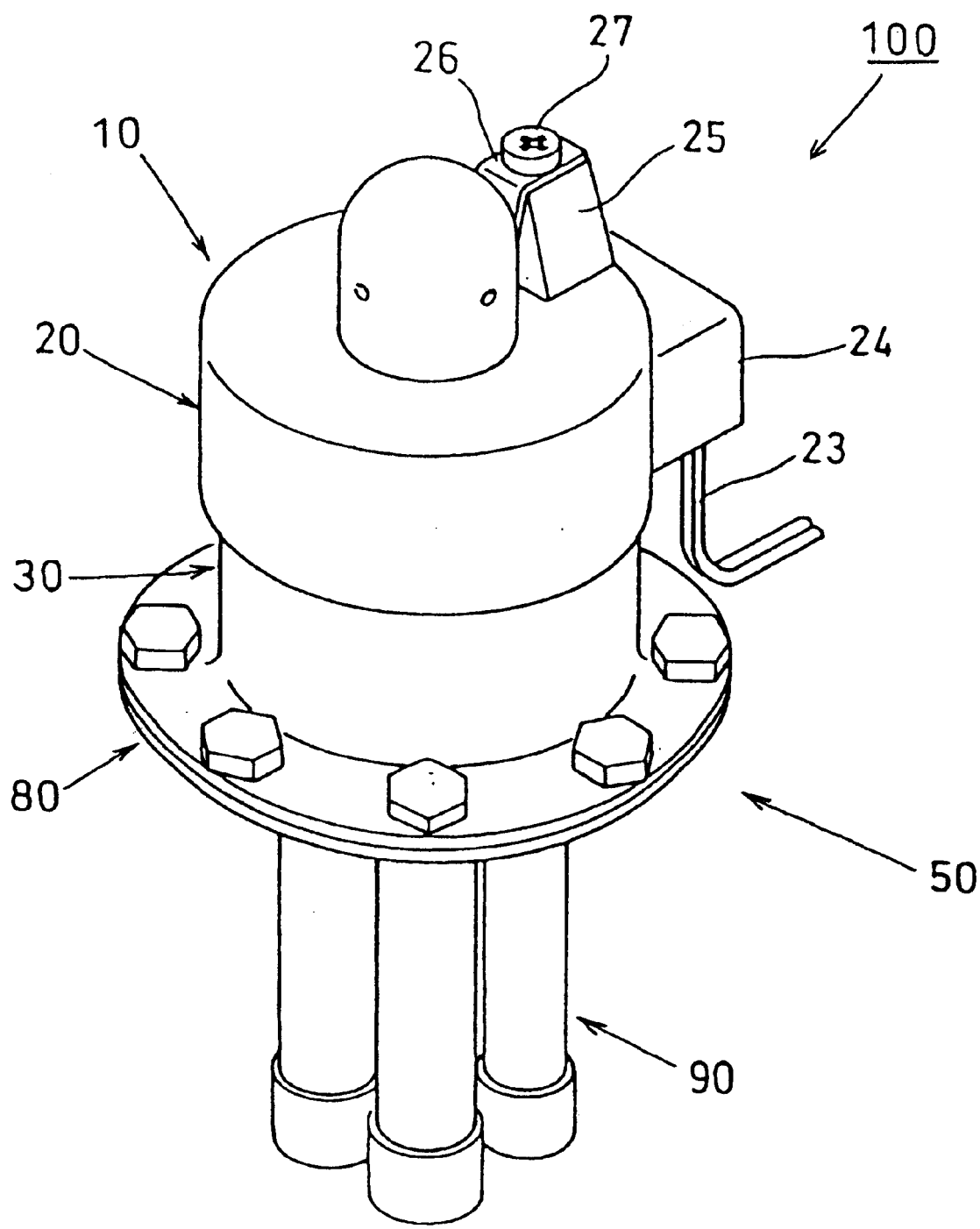
FIG. 1 is a perspective illustration for appearance of the four-way selector valve in the first embodiment of the invention.
Figure 2:
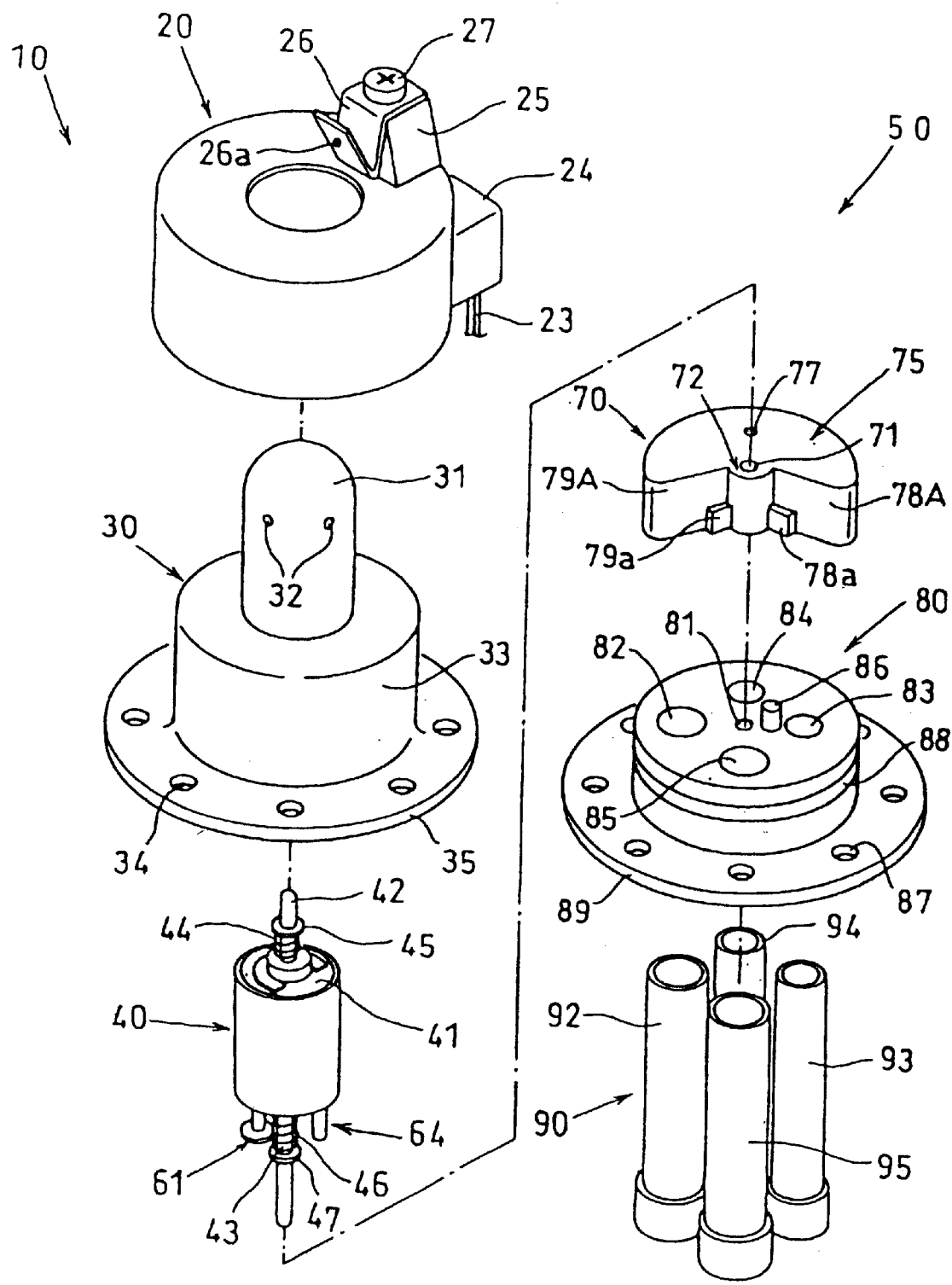
FIG. 2 is an exploded perspective illustration for the four-way selector valve as shown in FIG. 1.
Figure 3:
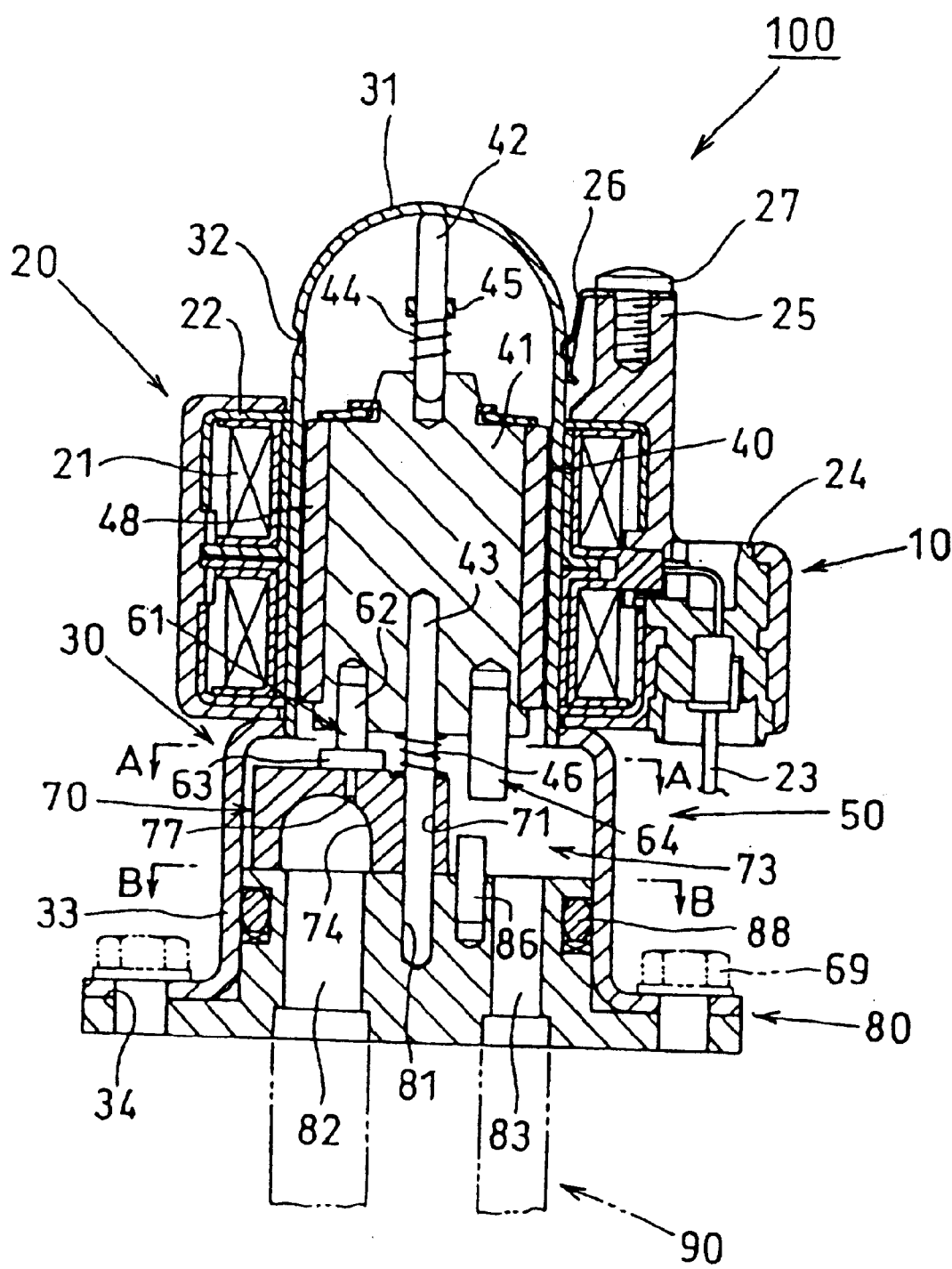
FIG. 3 is a vertical sectional view of the four-way selector valve as shown in FIG. 1.
Figure 4:
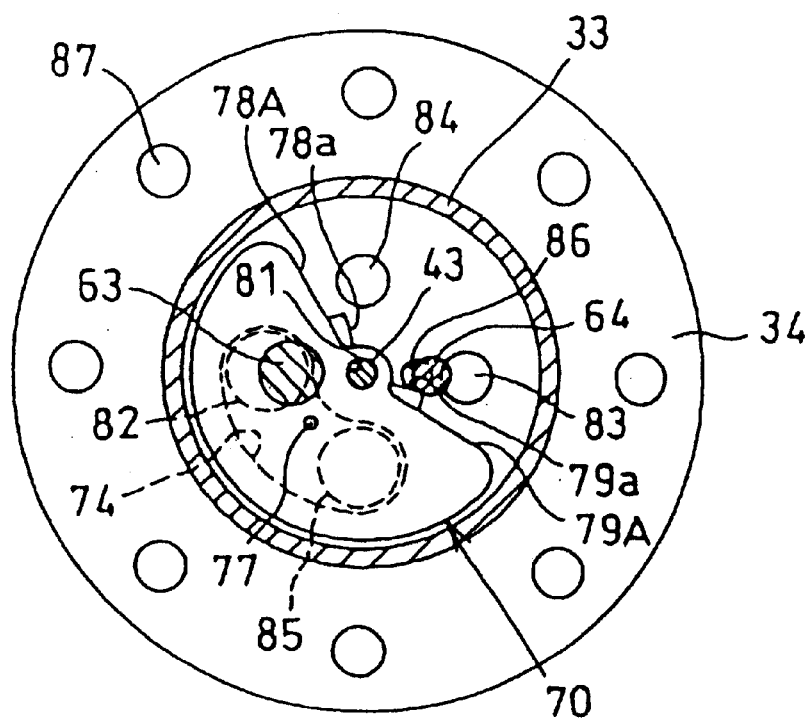
FIG. 4A is a sectional view of the four-way selector valve, taken along the line 4A—4A of FIG. 3.
FIG. 4B is a sectional view of the four-way selector valve, taken along the line 4B—4B of FIG. 3.
Figure 4:
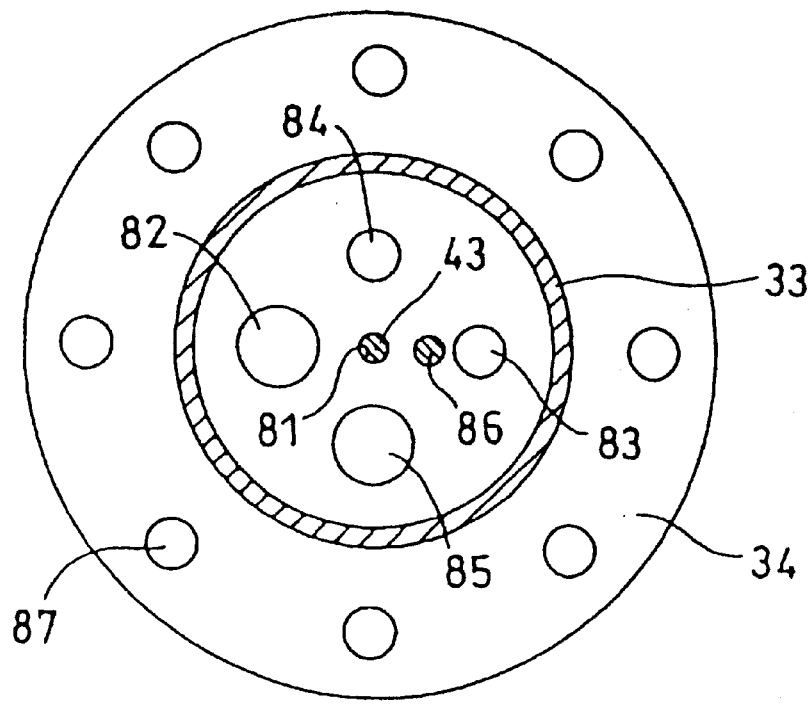

Referring to the drawings, the embodiments of the four-way selector valve according to the invention are described below. FIGS. 1 through 4A and 4B illustrate an embodiment of the four-way selector valve according to the invention. FIG. 1 is a perspective view of appearance of the four-way selector valve according to the embodiment. FIG. 2 is a perspective view of the four-way selector valve. FIG. 3 is a vertical sectional view of the four-way selector valve. FIGS. 4A and 4B consist of sectional views of the four-way selector valve as illustrated in FIG. 3.

The four-way selector valve 100 in the illustrated embodiment comprises a motor 10 equipped with a stepping motor, and a main body 50 equipped with a main valve 70. For this four-way selector valve 100, a main valve 70 rotates on a seat valve 80 when the stepping motor is turned on, so that the flow path for refrigerant is switched.

The motor 10 comprises a stator 20 and a rotor 40. The stator 20 is provided with a stator coil 21 and a yoke 22 which are vertically housed therein. A cable 23 consisting of bundled lead wires and a connector 24 provided on the outer surface of the stator 20 are connected to the stator coil 21.

A mount 25 of given height is provided on the top of the stator 20. A snapper 26 made of a metal sheet is retained to the mount with a screw 27. A relatively thin, spherical part 26a of the snapper 26 engages into one of four dimples 32 which are provided at given angles (90 degrees each) and spacing on the circumferential surface of a upper cylindrical part 31 of a case 30 which will be described later. This prevents the stator 20 from rotating and slipping off the upper cylindrical part 31. When the spherical part 26a engages with one of the dimples 32, they fit to each other on the same surface.

The rotor 40 comprises a rotor sleeve 41, an upper supporting shaft 42 which is inserted into the center of the top of the rotor sleeve 41, and a lower supporting shaft 43 which is inserted into the center of the bottom of the rotor sleeve 41. The rotor sleeve 41 is equipped with a magnet 48 on its circumferential surface.

The upper end of the upper supporting shaft 42 makes point-contact with the peak of the inner spherical surface of the upper cylindrical part 31. The upper supporting shaft 42 is provided with an upper coil spring 44 which is an elastic member to energize or press a rotor sleeve 41 and an auxiliary valve 61, which is a relief valve and will be described later, toward a main valve 70 via a spring holder 45, which is an integral part of the upper supporting shaft 42, and others. On the other hand, the lower supporting shaft 43 is provided with a lower coil spring 46 which is an elastic member to energize or press the main valve 70 toward a valve seat 80 (i.e., to energize or press the rotor sleeve 41 upward) via a spring holder 47 and others. The energizing force of the upper coil spring is larger than that of the lower coil spring. Thus, the auxiliary valve 61 is energized toward the main valve 70, and the main valve 70 is energized toward the valve seat 80.

The main body 50 comprises a case 30, which is a can, the main valve, the valve seat 80, and a group of conduits 90. The case 30 according to this embodiment consists of an upper cylindrical part 31 with a spherical top, a lower cylindrical part 33 having larger diameter than that of the upper cylindrical part 31. The lower cylindrical part extends from the bottom of the upper cylindrical part 31 and forms a single unit therewith, and a flange 35 which outwardly extends from the bottom of the lower cylindrical part 33. The upper cylindrically part 31 is covered with the rotor 40, and the rotor 40 is covered with the upper cylindrical part 31. The lower cylindrical part 33 covers the valve seat 80 which has a flange 89 at its bottom. The flange 35 and the flange 89 are coupled with bolts 69 so that the case 30 and the valve seat 80 are retained as a single unit. The main valve 70 is accommodated within the lower cylindrical part 33 of the case 30, and placed on the top of the valve seat 80 so as to allow the main valve 70 to slide thereon. The internal part of the lower cylindrical part 33 is formed as a valve chest 73.

The auxiliary valve 61 and a relatively cylindrical operating pin 64 are provided on the top of the main valve 70. The auxiliary valve 61 opens/closes a pressure equalization orifice 77 in the main valve 70, thereby making connection/disconnection with the valve chest 73 in the case 30 so that pressure can be moved. The operating pin 64 rotates together with the rotor 40, thereby sliding the main valve 70. The auxiliary valve 61 and the operating pin 64 are retained to respective positions appropriately separated from a straight line passing through the axial center of the lower supporting shaft 43 of the rotor 40. A stator coil 21 is excited through a cable 23 and a connector 24. Thus, the main valve 70 is rotated on the valve seat 80 by the operating pin 64 via the rotor 40. Accordingly, switching between the flow paths for refrigerant, which will be described later, is performed. Along with this switching, the auxiliary valve 61 rotates on the main valve 70 via the rotor 40, thereby opening/closing the pressure equalization orifice.

The main valve forms a roughly fan-shaped part with a central part 72 which is connected to the lower supporting shaft 43, and a top surface 75 extending outward from the central part 72. At the central part 72, a connecting hole 71 is provided so that the lower supporting shaft can be inserted thereinto.

The main valve 70 has pin contactors 78A and 79A provided symmetrically on its right and left surfaces. In addition, stopper contactors 78a and 79a, which make contact with main valve stopper 86 provided on the valve seat 80, are located on the lower parts of the pin contactors 78A and 79A. The stopper contactors 78a and 79a are shaped so as to provide the optimal control curve, control line, or the like, which assures that the main valve 70 is rotated in accordance with the rotational angle per unit pulse of the stepping motor via the operating pin 64 and that the motion of the main valve 70 is regulated by making contact with the main valve stopper 86.

Apart from the above configuration, the main valve 70 and the valve seat 80 in this embodiment may be configured to use magnets such as a ferrite magnet for the stopper contactors 78a and 79a thereof, and using a magnetic substance of iron or the like for the main valve stopper 86. In this case, the contact between the stopper contactors 78a or 79a and the main valve stopper 86 is maintained with magnetic force. This ensures that the position of switching between the flow paths by the main valve is more securely held with magnetic force 70, and enables further improvement of the vibration resistance of the four-way selector valve 100. Of course, the intensity of the magnetic force is set, as appropriate, to a smaller value than the rotational force 10 of the motor 10.

If the central part 72 of the main valve 70 and the top surface 75 thereof are made of resin, the stopper contactors 78a and 79a are molded by insert molding. If the central part 72 and the top surface 75 are made of metal such as aluminum, the stopper contactors 78a and 79a may be bonded. The stopper contactors 78a and 79b may be magnetic bodies, and the main valve stopper 86 may be made of a magnet.

The main valve 70 internally provides a connecting part 74 which connects to one of a suction pressure passage 82 in the valve seat 80, a passage hole 84 for the outdoor heat exchanger, and a passage hole 85 for the indoor heat exchanger, and a pressure equalization orifice 77 which connects the connecting part 74 and the valve chest 73.

The auxiliary valve 61 comprises a rotor press-fitting part 62 and a blocking part 63 for the pressure equalization orifice. The rotor press-fitting part 62 is press-fit and retained to the bottom of the rotor 40. The blocking part 63 for the pressure equalization orifice makes contact with the top of the main valve 70. Both the pressure of refrigerant in the valve chest 73 and that for refrigerant in the connecting part 74 are given to the top and bottom of the main valve 70.

The top of the valve seat 80 is flat, making contact with the bottom of the main valve 70. A bolt 69 is inserted into a bolt hole 87 in a flange 89 from the bottom of the valve seat and a bolt hole 34 in a flange 35 of the case 30, and then tightened. As illustrated in FIGS. 4A and 4B, the central part has a press-fitting hole 81 in which the lower supporting shaft 43 is press-fit and retained. In given positions radially separated from the center of the lower supporting shaft 43, there are a suction pressure passage 82 which introduces the suction pressure of the compressor, a discharge pressure passage 83 which introduces the discharge pressure, a passage hole 84 for the outdoor heat exchanger, and a passage hole 85 for the indoor heat exchanger. In addition, a main valve stopper 86, which is shaped like a cylinder and used to regulate the rotational position of the main valve 70, is secured. The case 30 and the valve seat 80 are coupled and retained with an O-ring, making the valve chest 73 airtight.

As illustrated in FIG. 4, the suction pressure passage 82 and the discharge pressure passage are symmetrically provided with respect to the lower supporting shaft 43. In addition, the passage hole 84 for the outdoor heat exchanger and the passage hole 85 for the in door heat exchanger are symmetrically provided with respect to the lower supporting shaft 43 at given angles from the suction pressure passage 82 and the discharge pressure passage 83. The main valve stopper 86 is provided in an appropriate position along the straight line between the suction pressure passage 82 and the discharge pressure passage 83, and located between the lower supporting shaft 43 and the discharge pressure passage 83. The group of conduits 90 consists of four conduits, namely, a suction pressure conduit 92 which is connected to the suction pressure passage 82, a discharge pressure conduit 93 which is connected to the discharge pressure passage 83, a conduit 94 for the outdoor heat exchanger, which is connected to the passage hole 84 for the outdoor heat exchanger, and a conduit 95 for the indoor heat exchanger, which is connected to the passage hole 85 for the indoor heat exchanger. Each of the conduits is connected and retained to the bottom of the valve seat 80.

At least one of the main valve 70, the auxiliary valve 61, and the valve seat 80 according to this embodiment may be coated with lubricative anodized aluminum film. For the lubricative anodized aluminum film, e.g., "KASHIMA COAT" (product name: Miyaki Co., Ltd.) is used as follows: The main valve 70 is made of aluminum. This aluminum is anodized to create a hard alumina layer. Molybdenum disulfide is electrolytically deposited. Coating this lubricative anodized aluminum film improves the lubricative property of the main valve 70.

Not only the main valve 70, but also a blocking portion of the pressure equalization orifice 63 on the auxiliary valve 61 and the valve seat 80 are made of aluminum. The lubricative anodized aluminum film is coated over them, enabling further improvement of the lubricative property between the auxiliary valve 61 and the main valve 70 and that between the main valve 70 and the valve seat 80.

For the lubricative anodized aluminum film, not only the "KASHIMA COAT," but also "UNIMITE" (product name: Ueda Anodized Aluminum Film Industries Co., Ltd.) or "TOUGHMITE" (product name: Ueda Anodized Aluminum Film Industries Co., Ltd.) may similarly be used for at least one of the main valve, the auxiliary valve, and the valve seat.

Coating the lubricative anodized aluminum film decreases the sliding friction between the auxiliary valve and the main valve and that between the main valve and the valve seat, thereby making the operation stable. The improved lubricative property enables the operation of the four-way selector valve at low torque. Thus, the motor can be downsized.

The operation of the four-way selector valve 100 is described below. FIGS. 5A through 5D and FIGS. 6A through 6D illustrate the operation of the four-way selector valve 100 according to its internal structure. FIGS. 5A through 5D illustrate the same operation condition as shown in FIGS. 6A through 6D respectively.

Figure 5:
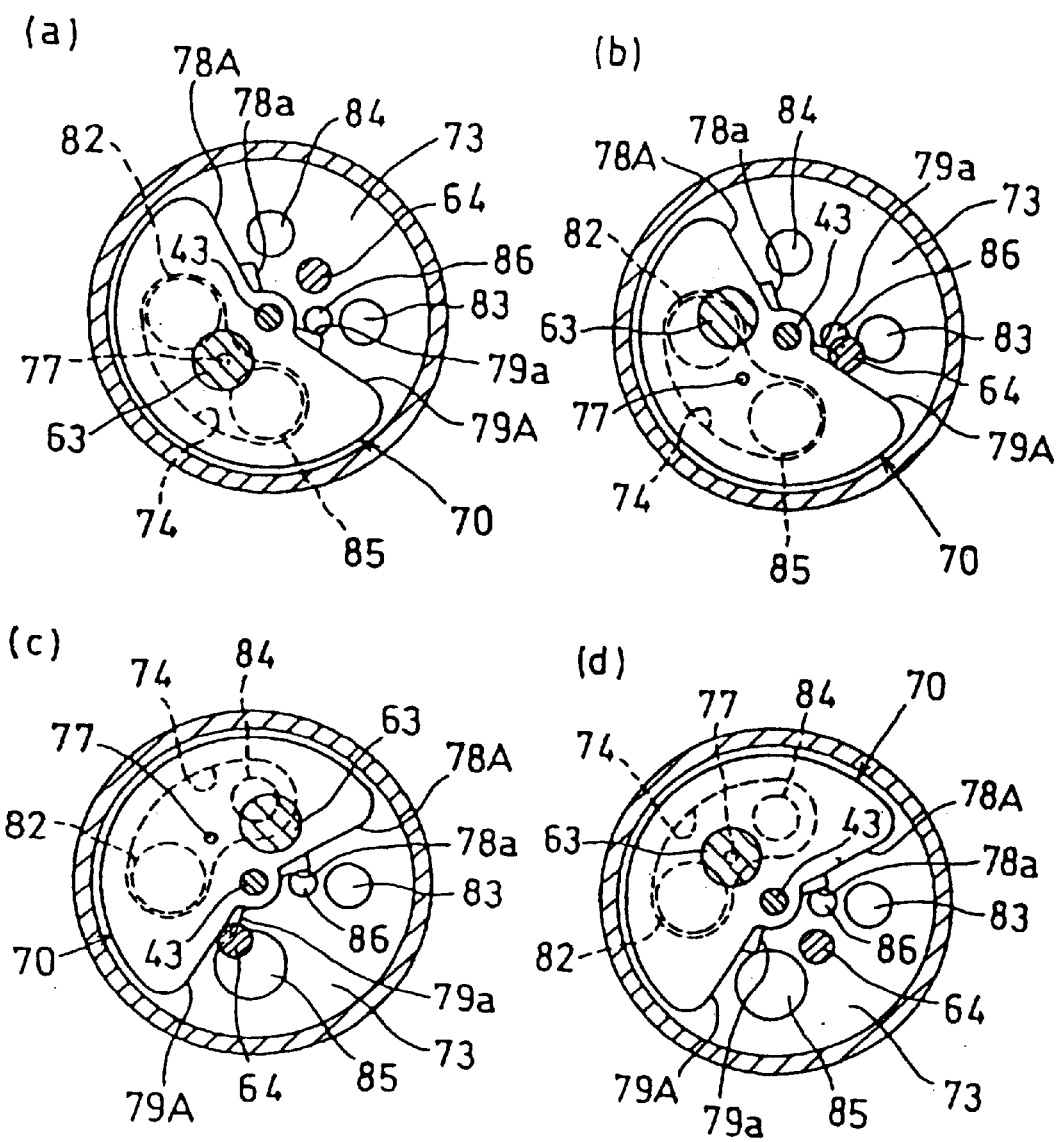
FIGS. 5A through 5D are top views illustrating the operation of the four-way selector valve as shown in FIG. 1.
Figure 6:
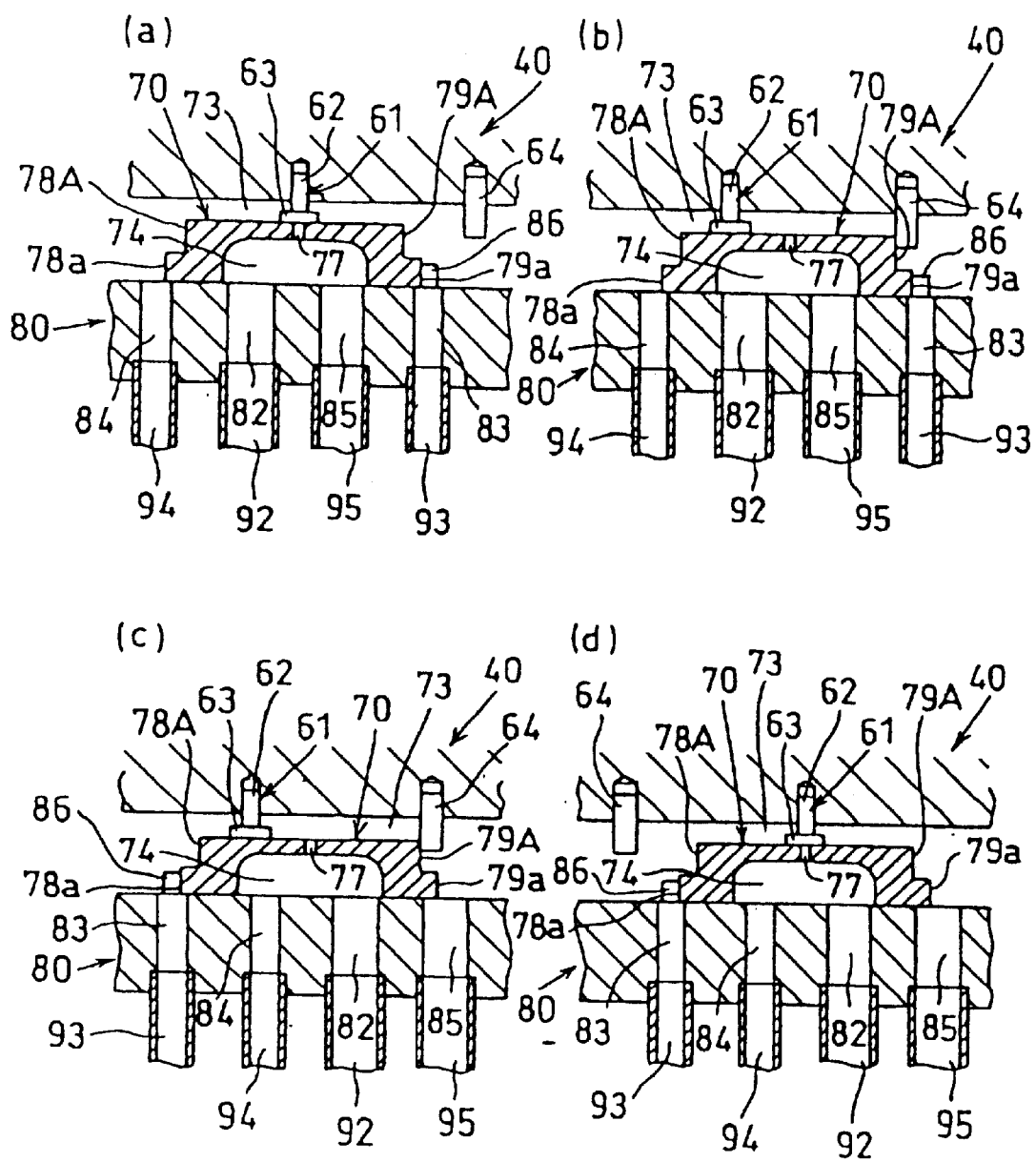
FIGS. 6A through 6D are vertical sectional views of the four-way selector valve as shown in FIG. 1.

FIGS. 5A and 6A illustrates the setup for the cooling operation, wherein the suction pressure conduit 92 and the conduit 95 for the indoor heat exchanger are connected via the connecting part 74 of the main valve 70, and wherein the discharge pressure conduit 93 and the conduit 94 for the outdoor heat exchanger are connected to the outside of the main valve 70, i.e., to the valve chest 73. In this state, there is a great difference between the pressure in the valve chest 73 and that in the connecting part 74. The main valve 74 is pressed against the valve seat 80 with this pressure difference and does not move easily. Therefore, the four-way selector valve 100 according to this embodiment uses the auxiliary valve 61, which is a relief valve, to switch the flow path for refrigerant from this state. This is intended to balance the pressure in the valve chest 73 with that in the connecting part, and to rotate the main valve 70 after eliminating the force which press the main valve 70.

In the state of FIGS. 5A and 6A, the operating pin 64 and the auxiliary valve 61, which are rotated via the rotor 40 by pulse input to the stepping motor, are rotated clockwise as shown in FIGS. 5B and 6B. This releases the pressure equalization orifice 77 in the main valve 70, which has been closed by the blocking part 63 for the pressure equalization orifice on the auxiliary valve 61. Thus, the refrigerant in the valve chest 73 is sent to the connecting part 74 via the pressure equalization orifice 77, and then the pressure in the valve chest 74 is balanced with that in the connecting part 74.

As in the state of FIGS. 5B and 6B, after the balance has been acquired between the pressure in the valve chest 73 and that in the connecting part 74, the operating pin 64, which makes contact with the pin contactor 79A on the main valve 70, presses the main valve 70, thereby rotating and sliding the main valve 70 clockwise on the valve seat 80. The rotation continues until the stopper contactor 79a separates from the main valve stopper 86 and the other stopper contactors 78a make contact with the main valve stopper as shown in FIGS. 5C and 6C. This operation switches the connection between-the suction pressure conduit 92 and the conduit 95 for the indoor heat exchanger by the main valve 70 to that between the suction pressure conduit 92 and the conduit 95 for the indoor heat exchanger 95. If the stopper contactor 78a and the main valve stopper 86 maintain the contacting state by their own magnetic force, the main valve 70 is more securely retained to its position.

As in the state shown in FIGS. 5C and 6C, the suction pressure conduit 92 and the conduit 94 for the outdoor heat exchanger reversibly rotate the stepping motor after they has been connected in the connecting part 74. This continues to rotate the operating pin 64 and the auxiliary valve 61 counterclockwise as shown in FIGS. 5D and 6D until the blocking part 63 for the pressure equalization orifice on the auxiliary valve 61 closes the pressure equalization orifice 77 in the main valve 70. This operation results in the setup for the heating operation, wherein the suction pressure conduit 92 and the conduit 94 for the outdoor heat exchanger are connected via the connecting part 74 of the main valve 70 and wherein the discharge pressure conduit 93 and the conduit 95 for the indoor heat exchanger are connected via the valve chest 73.

To switch the state shown in FIGS. 5D and 6D to the setup for the cooling operation in the state shown in FIGS. 5A and 6A, e.g., the pressure equalization orifice 77 closed by the blocking part 63 for the pressure equalization orifice on the auxiliary valve should be released, and then the main valve 70 should be rotated until the operating pin 64 makes contact with the contactor 78A and the stopper contactor 79a makes contact with the main valve stopper 86.

As stated above, the embodiment according to the invention provides the following function using the above configuration:

For the four-way selector valve 100 according to the embodiment, after the auxiliary valve 61 has been rotated on the main valve 70 with input pulse of the motor 10, the main valve is rotated on the valve seat 80. Therefore, after the pressure balance between the valve chest 73 and the connecting part 74 has been acquired, the refrigerant flow can be switched. This means that the flow paths for refrigerant can be switched more easily and quickly than in the case where the main valve is rotated using elastic members. In addition, the reliability of the four-way selector valve can be improved.

The auxiliary valve 61 is positioned between the rotor 40 and the main valve 70, mounted on the main valve 70, and pressed by the upper coil spring 44 toward the main valve 70. It rotates together with the rotor 40 and functions as a relief valve which eliminates a pressure difference between the connecting part 74 and the valve chest 73. Therefore, the flow path for refrigerant can be switched promptly, and product cost for the four-way selector valve can be reduced by decreasing the number of movable parts.

If the stopper contactors 78a and 79a, and the main valve stopper 86 maintain the contact state by their own magnetic force, the switching position of the main valve 70 with respect to the valve seat 80 can securely be held against vibrations. Thus, the reliability of the four-way selector valve 100 can be further improved.

One embodiment according to the invention has been described above in detail. However, the invention is not limited to this embodiment, nor limited to any air conditioner, but can be applied for every product that switches a flow path.

Figure 7:
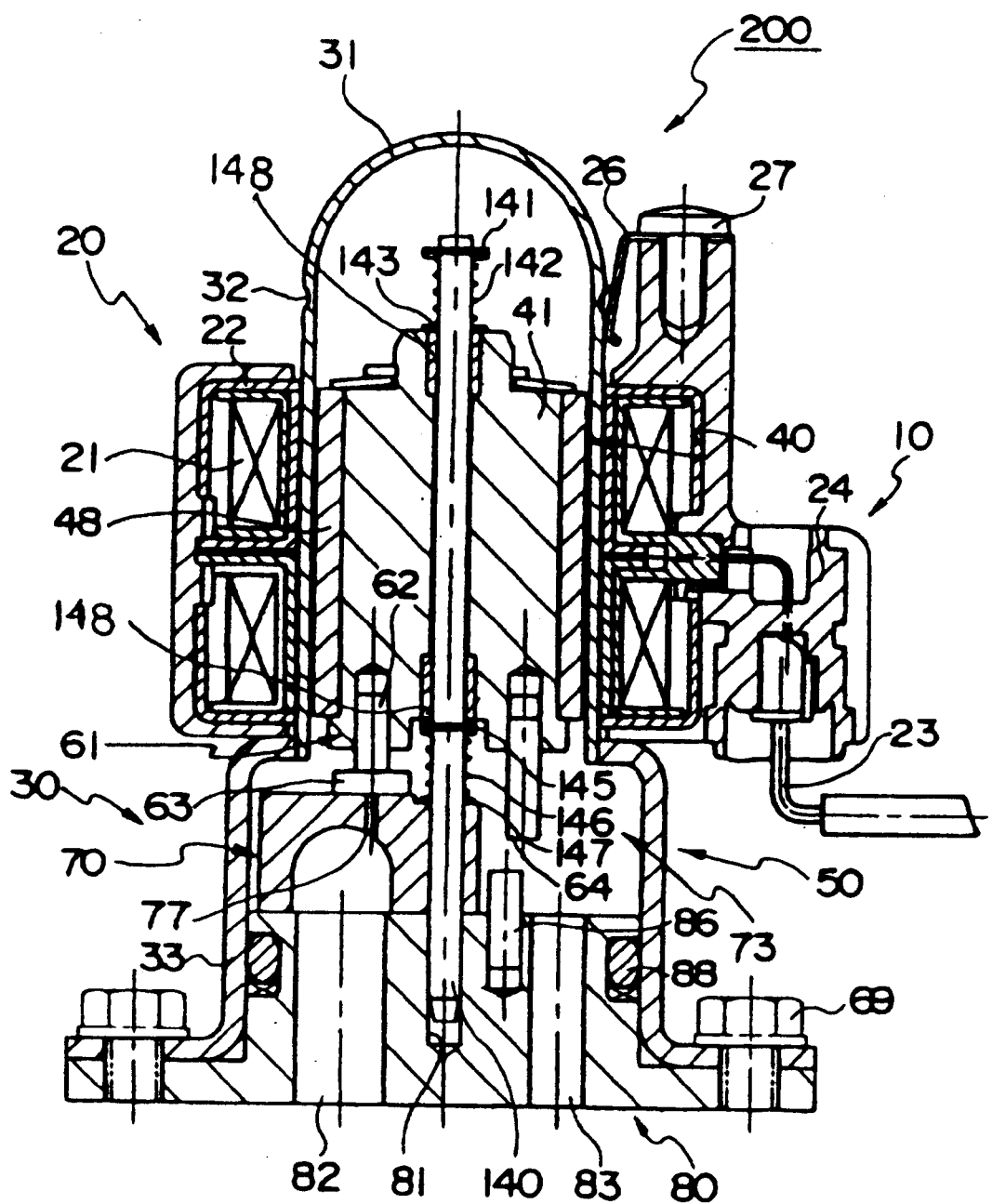
FIG. 7 is a vertical sectional view of the four-way selector valve in another embodiment of the invention.
Figure 8:
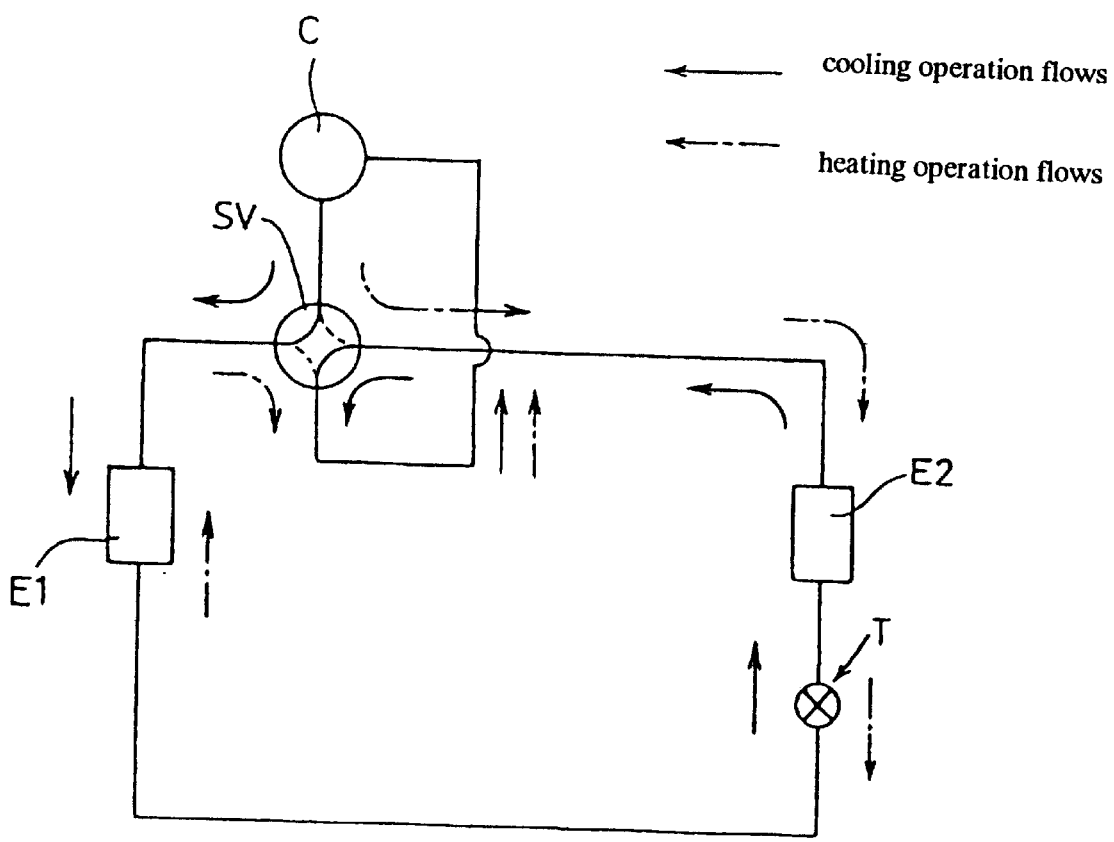
FIG. 8 is a diagram of cyclic flow for air-conditioning.

FIG. 7 is a sectional view illustrating another embodiment according to the invention.

The four-way selector valve as generally represented by code 200 has the same configuration as that of the previously described four-way selector valve. Therefore, the same parts are assigned the same code and the description thereof is omitted.

For the four-way selector valve 200, a supporting shaft 140 which supports a rotor 140 comprises a single shaft. The supporting shaft 140 is press-fit into a press-fitting hole 81 in a valve seat 80 and then retained. A bearing 148 is located in two places, the top and bottom of a rotor sleeve 41, between the supporting shaft 140 and the rotor sleeve 41.

A snap ring 141 and a coil spring 142 are fit to the end of the supporting shaft 140 opposite to the side of the valve seat 80. The coil spring 142 energizes a rotor 140 toward the valve seat 80 via a spring holder ring 143. A snap ring 145 and a coil spring 146 are fit between the rotor sleeve 41 of the supporting shaft 140 and the main valve 70. The coil spring 146 energizes the main valve 70 toward the valve seat 80 via a spring holder ring 147.

The four-way selector valve 200 further decreases the number of parts, requires no shaft alignment as opposed to the case where two supporting shafts are used, and has a simpler structure. In addition, the rotational accuracy of the rotor is improved.

As can be understood from the above description, the four-way selector valve according this invention has the auxiliary valve provided on the top of the main valve. After the pressure balance between the valve chest and the connecting part of the main valve has been acquired, the positional switching of the main valve is performed. Therefore, the switching operation between the flow paths for refrigerant can be improved so that it becomes easier and quicker. At the same time, the product cost for the selector valve can be reduced.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application No. 2000-330377 filed Oct. 30, 2000, including specification, drawings and claims are herein incorporated by reference in its entirety.

We claim:

1. A four-way selector valve comprising a motor having a stator and a rotor, a case, and a main body including a main valve and a valve seat, the main valve and the valve seat are arranged in a valve chest within the case;

the valve seat comprises a suction pressure passage a discharge pressure passage and first and second passage holes, the suction pressure passage is connected to a suction port of a compressor, the discharge pressure passage is connected to a discharge port of the compressor, the first and second passage holes are connected to indoor and outdoor heat exchangers respectively;

the main valve comprises a connecting part which leads the suction pressure passage to one of the first and second passage holes and a pressure equalization orifice which links the connecting part and the valve chest;

the rotor comprises a rotor sleeve comprising an auxiliary valve in slidable contact with the main valve and an operating pin disposed in the valve chest, the auxiliary valve opens or closes the pressure equalization orifice that opening the auxiliary valve equalizes pressure between the connecting part and the valve chest and closing the auxiliary valve results in a pressure difference between the connecting part and the valve chest, and operating pin moves the position of the main valve; and the rotor rotates to change the four-way selector valve from a first selector valve operating state to a second selector valve operating state, wherein, upon changing from the first selector valve operating state to the second selector valve operating state, the rotor rotates causing both the auxiliary valve and the operating pin to rotate simultaneously in a manner that the auxiliary valve in a closed pressure equalization orifice condition immediately rotates to move away from the pressure equalization orifice to an open pressure equalization orifice condition and the operating pin initially rotates without contacting the main valve and, after the auxiliary valve moves to the open pressure equalization orifice condition, the operating pin continues rotation and subsequently contacts the main valve to move the main valve from a first valve position to a second valve position and, when the main valve is in the second valve position, the rotor rotates in a reverse direction to simultaneously move the auxiliary valve to the closed pressure equalization orifice position and the operating pin out of contact with the main valve resulting in the four-way selector valve to be in the second selector valve operating state.

2. The four-way selector valve according to claim 1, the auxiliary valve is a relief valve located between the rotor and the main valve, retained to the rotor sleeve, and slidably mounted on the main valve.

3. The four-way selector valve according to claim 1, the rotor sleeve comprises a supporting shaft which is concentric to rotational center of the main valve, the operating pin retained to the rotor sleeve rotates the main valve according to the rotation of the rotor.

4. The four-way selector valve according to claim 3, the supporting shaft comprises an elastic member which presses the auxiliary valve and the main valve onto the valve seat.

5. The four-way selector valve according to claim 1, the valve seat comprises a main valve stopper which regulates the turning range of the main valve, and the main valve comprises a stopper contactor which makes contact with the main valve stopper.

6. The four-way selector valve according to claim 5, at least one of the main valve stopper and the stopper contactor comprises one of a magnet and a magnetic substance.

7. A four-way selector valve according to claim 1, at least one of the main valve, the valve seat, and the auxiliary valve is coated with lubricative anodized aluminum film.

* * * * *